United States Patent [19]

Zweifel et al.

[11] Patent Number: 5,036,480
[45] Date of Patent: Jul. 30, 1991

[54] METHOD AND APPARATUS FOR SIMULATING MICROBURST WINDSHEARS

[75] Inventors: Terry L. Zweifel; J. Rene Barrios, both of Phoenix, Ariz.

[73] Assignee: Honeywell Inc., Minneapolis, Minn.

[21] Appl. No.: 492,000

[22] Filed: Mar. 12, 1990

[51] Int. Cl.$^5$ .............................................. G08B 23/00
[52] U.S. Cl. .................................... 364/578; 364/434; 340/968
[58] Field of Search ............... 364/578, 801, 803, 805, 364/806, 200, 900, 550, 434, 571.01; 340/968

[56] References Cited

U.S. PATENT DOCUMENTS

| | | | |
|---|---|---|---|
| 4,593,285 | 6/1986 | Miller et al. | 340/968 |
| 4,937,571 | 6/1990 | Bonafe | 340/968 |
| 4,965,573 | 10/1990 | Gallagher et al. | 340/968 |

OTHER PUBLICATIONS

Windshear Escape; Harry Hopkins; Jul. 6, 1985.
Flight Dynamics Prepares to Test Wind Shear Guidance with HUD; Aviation Week & Space Technology; 1/12/87; pp. 107-111.
The Missing Element in Wind Shear Protection; Sam Saint; Business Aircraft Meeting & Exposition; Wichita, Kansas; Apr. 12-15, 1983.

Primary Examiner—Parshotam S. Lall
Assistant Examiner—Michael Zanelli
Attorney, Agent, or Firm—Arnold L. Albin

[57] ABSTRACT

A method and apparatus for simulating a windshear. A vortex is modelled in terms of a family of concentric streamlines and the position of an aircraft is defined with respect to the vortex as the aircraft traverses a reference plane. Four or more vortices are used to generate streamlines which match those encountered in an actual microburst. Each vortex placed above the simulated ground level is matched by a vortex of equal strength but opposite rotation placed below the simulated ground level at a distance equal but opposite to the height of the vortex above the ground. Strengths, distance from the vortex center, and height of the vortex may be programmed by the user. The high degree of flexibility permits accurate reproduction of the winds generated by actual microbursts for testing and developing microburst detection devices. The use of an algorithm which may be dynamically varied as a function of aircraft position obviates the need for simulating by discrete windshear magnitude as in conventional predetermined windshear tables and minimizes data storage requirements.

18 Claims, 11 Drawing Sheets

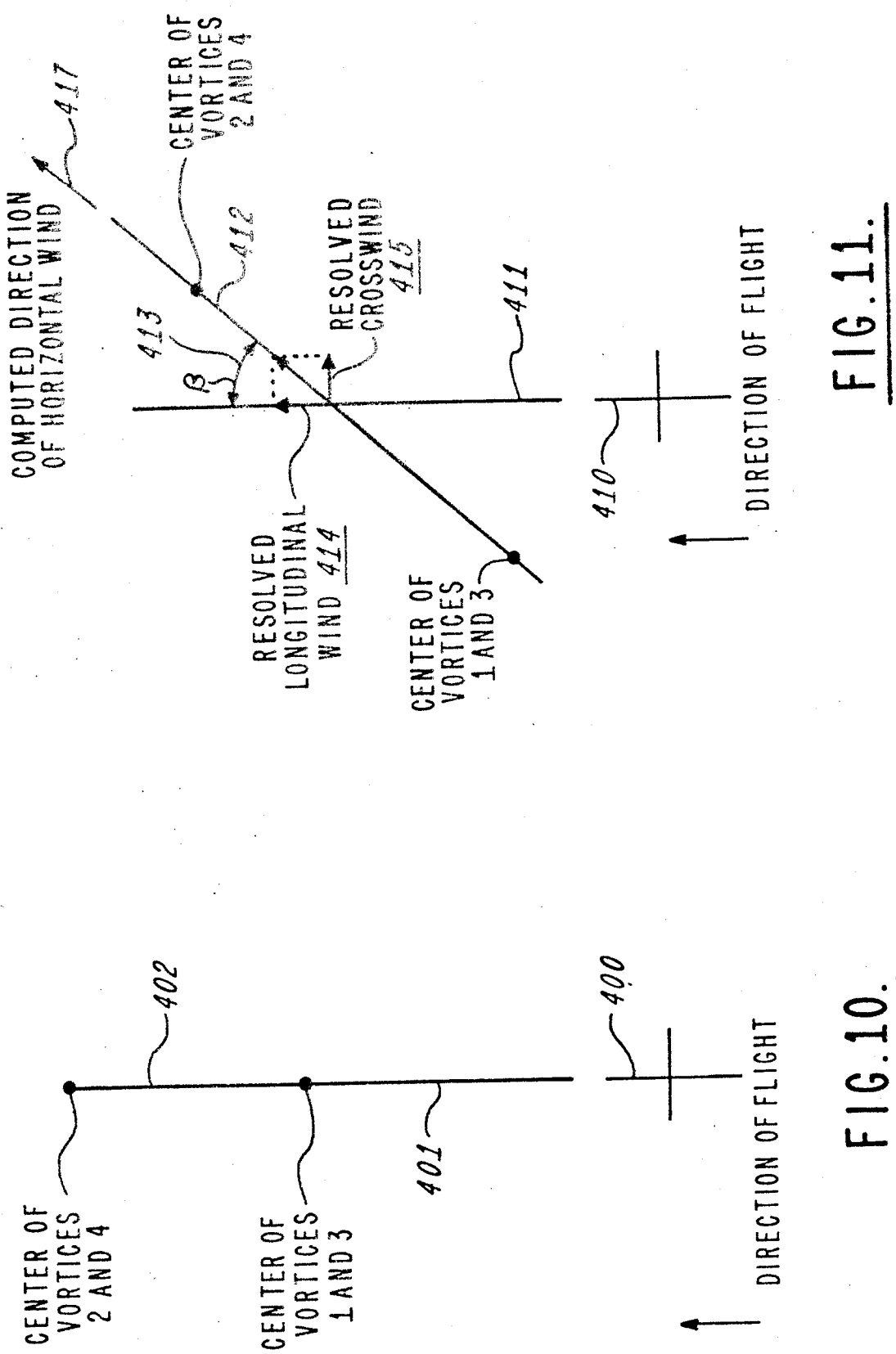

METHOD AND APPARATUS FOR SIMULATING MICROBURST WINDSHEARS

BACKGROUND OF THE INVENTION

1. Field of the Invention

The present invention relates to the generation of windshear models and more specifically to the simulation of microburst windshears for use in research and development of windshear detection equipment for use on aircraft.

2. Description of the Prior Art

Windshear is a weather phenomenon which results in rapidly changing wind velocity o direction and in terms of aircraft flight performance is dangerous during the take off and landing phases of flight. Of the causes of windshear, the microburst has been identified as the most hazardous to aircraft. Several severe aircraft accidents have been attributed to the microburst, the most recent being the crash of a Lockheed L-1011 aircraft at the Dallas-Fort Worth International Airport on Aug. 2, 1985.

The avionics industry is currently in process or has already developed windshear detection systems for installation on aircraft to alert the flight crew of a microburst encounter. One such system is described in U.S. Pat. No. 4,593,285 entitled "Windshear Detection and Warning System with Evasion Command," issued June 3, 1986, and assigned to the assignee of the present invention. In the development of such systems, it is necessary to generate a simulated environment that creates winds similar in nature to those known to exist in actual microbursts. These simulated microburst winds are then used by the windshear detection system to establish thresholds of wind magnitudes or rates at which it is prudent to provide a warning of rapidly changing winds.

In the prior art, these simulated winds were generated in a number of ways. One method changed the wind magnitude as a function of altitude above the ground. In this scheme, as the aircraft climbed after take off, the wind would therefore change. Similarly, as the aircraft descended toward the ground as in the case of a landing, the wind would also change and thereby create a windshear. This scheme is unrealistic, however, in that no windshear would be generated should the aircraft maintain a constant altitude. In an actual microburst encounter, the winds may change both with altitude and distance travelled.

Another scheme used was the changing of winds as a function of the distance travelled along the ground. While this scheme eliminates the problem associated with constant altitude flight, it is also unrealistic in that the wind velocity is identical at all altitudes.

The scheme most in use today for the testing of windshear detection systems is one utilizing predetermined windshear tables in which winds are defined as a function of both altitude and distance. In this scheme, a finite number of points defined by both a distance and an altitude, typically on a grid arrangement, are used. At each point, the magnitudes of orthogonal winds are defined; that is, a horizontal wind magnitude is defined, a horizontal wind 90 degrees to the first is also defined, and finally a vertical wind is defined. In this manner, wind "fields" are thus established. An example of such a scheme may be found in the Federal Aviation Administration's Advisory Circular AC-120-41, entitled "Criteria for Operational Approval of Airborne Windshear Alerting and Flight Guidance Systems".

While the latter scheme is the most realistic of the prior art schemes in terms of generating simulated microburst windshears, it is, in general, cumbersome to use and requires substantial storage capability to define the large number of grid points necessary to establish the wind field. In addition, the wind field so described is unique to a particular microburst model. Consequently, a large number of such wind fields is necessary to adequately test a windshear detection system. This, of course, requires even more storage capability and complexity.

The present invention overcomes the shortcoming of the prior art by establishing a method of simulating microburst winds through the use of four or more vortex models. Each vortex model may be individually increased in strength, displaced relative to the other vortex models, and varied in altitude above the ground. This versatility permits the generation of an infinite number of microburst models and, in addition, allows the creation of microburst models similar to those encountered in actual aircraft accidents. Furthermore, since algorithms are used to determine wind magnitudes, rather than defining a fixed magnitude at a given location, storage requirements are greatly reduced.

SUMMARY OF THE INVENTION

The invention comprises a method and apparatus for simulating a microburst windshear for use with a simulated aircraft. An algorithm is provided for modelling in air vortex which represents a continuum of variations in air velocity at predetermined points with respect to a reference plane and a reference point of origin. The aircraft is positioned at a given height and distance with respect to the center of the vortex. The magnitude of the vortex thus generated may be selectively controlled so as to vary the magnitude of the streamline at any desired point. By utilizing the knowledge of the defined position of the aircraft and the magnitude of the vortex velocities at any desired point, the velocity components experienced by the aircraft as it traverses the ground plane may be determined.

In a preferred embodiment, at least four vortices are generated. Each of two opposing vortices placed above the reference plane, which may correspond to ground level, is matched by a vortex of equal strength but opposite direction of rotation placed below the reference plane at a distance equal but opposite to the height of the corresponding vortex above the ground.

BRIEF DESCRIPTION OF THE DRAWINGS

FIG. 10 is a drawing in plan view illustrating the case wherein the simulated flight path of the aircraft is parallel to the plane of the centers of the vortices.

FIG. 11 is a drawing illustrating how horizontal winds orthogonal to the simulated aircraft's flight path are generated as a function of the simulated aircraft's flight path and the plane joining the centers of the vortices.

DESCRIPTION OF THE PREFERRED EMBODIMENTS

Figure 1:
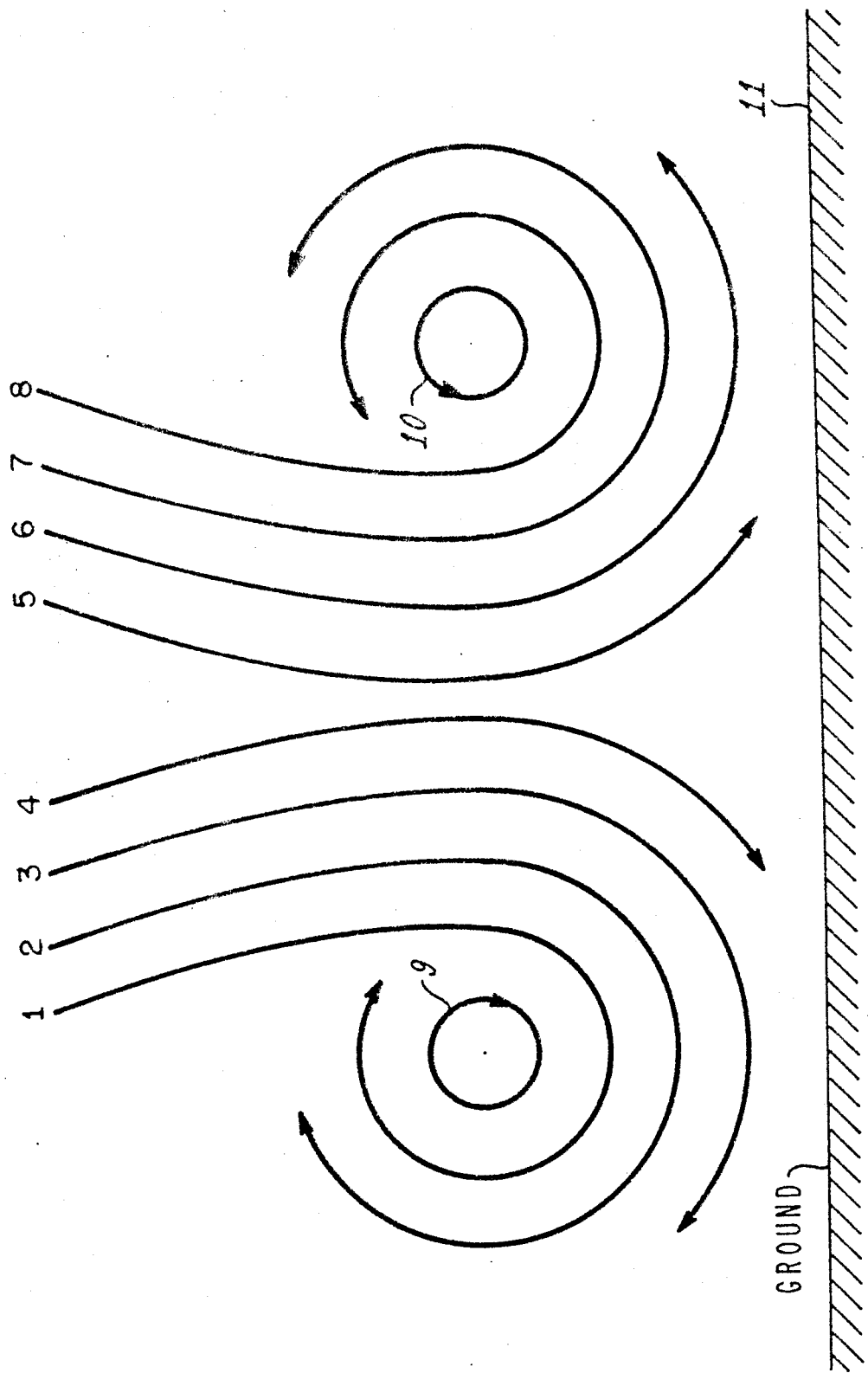
FIG. 1 is an idealized drawing illustrating the generic characteristics of an actual microburst.

FIG. 1 illustrates, in a general manner, the nature of the microburst in the actual atmosphere. Line segments 1 through 8 represent the streamlines of airflow as the air descends toward the ground, 11. As the air nears the ground, it will spread out initially in a horizontal direction and then begin rotating, thereby crating vortices 9 and 10. The vortices, hence, represent rapid rotational motion of air. It will be seen that vortex 9 rotates in a clockwise manner whereas vortex 10 rotates in a counterclockwise manner.

A single vortex is defined by the following:

$$\psi = \mu \theta \qquad (1)$$

where $\psi$ is the streamline function, $\mu$ is the vorticity of the vortex (strength), and $\theta$ is the angle of a radial line. In addition, the potential function of a vortex is given by:

$$\phi = \mu \log_e r \qquad (2)$$

where $\phi$ is the potential function, $\mu$ is thee vorticity and r the radial distance from the center of the vortex.

The actual tangential velocity of he air in a vortex is determined by:

$$V_r = \frac{\partial \phi}{\partial r} \qquad (3)$$

where Vr is the tangential velocity. Taking the partial derivative with respect to r of equation (2) above yields:

$$\frac{\partial \phi}{\partial r} = \frac{\mu}{r} \qquad (4)$$

Substitution into equation (3) then gives:

$$V_r = \frac{\mu}{r} \qquad (5)$$

Figure 2:
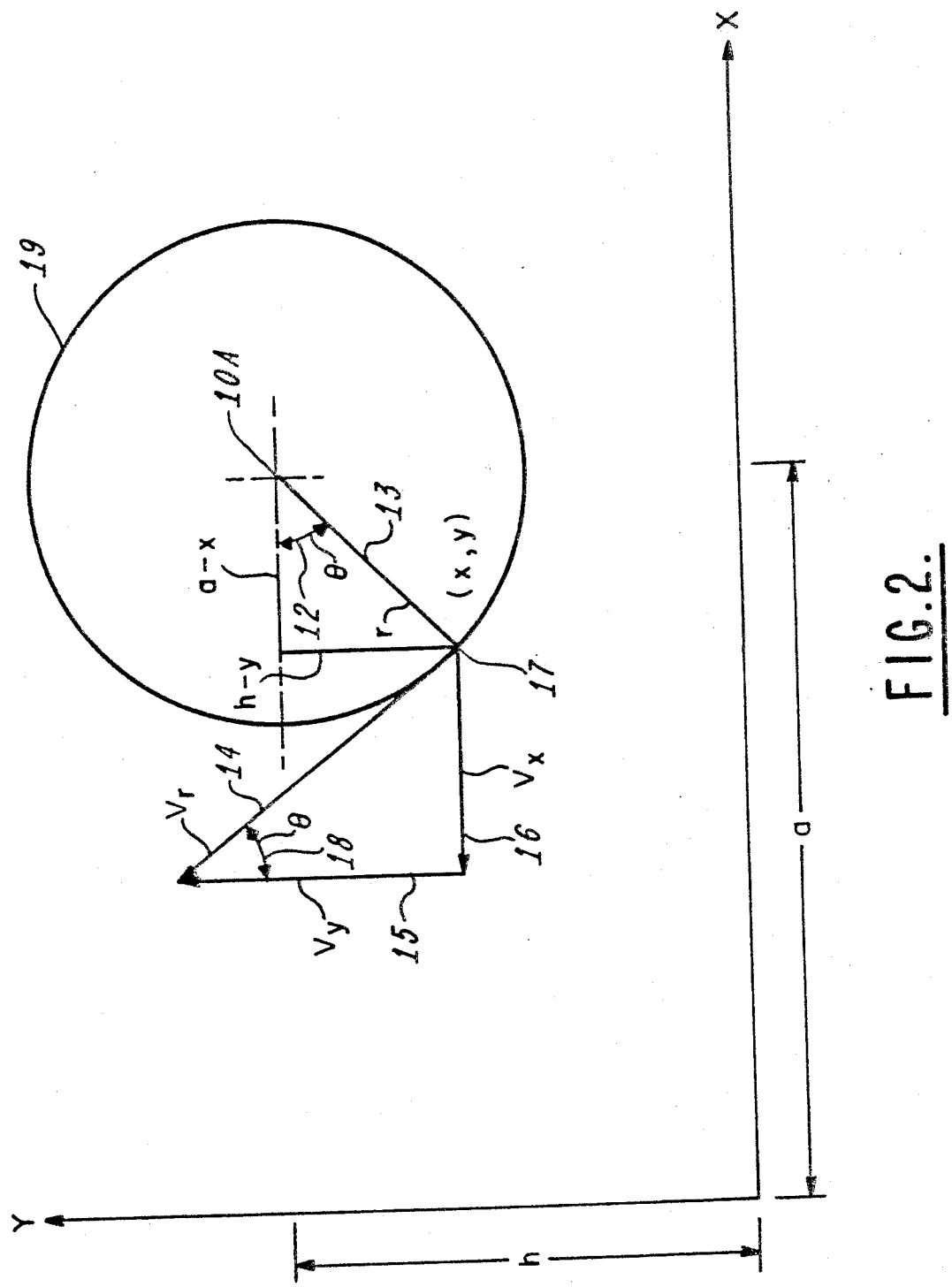
FIG. 2 is an illustration of the vector components present in an ideal vortex and how these forces are resolved in Cartesian coordinates.

Referring now to FIG. 2, point 10A represents the center of the vortex located at distance a along the X axis and distance h along the Y axis. Circle 19 represents any arbitrary streamline of distance r, 13, from the center. Coordinates x and y establish the position of an arbitrary point, 17, on the streamline. Angle $\theta$, 12, indicates the angle of the radius r from the horizontal.

From geometry, angle $\theta$, 18, must equal angle $\theta$, 12. Also, from geometry, the velocity of the air in the Y direction 15 is:

$$V_y = V_r \, \text{cosine} \, \theta \qquad (6)$$

and, similarly, the velocity of the air in the X direction is:

$$V_x = V_r \, \text{sine} \theta \qquad (7)$$

Again using conventional geometric relationships, it can be seen from FIG. 2 that the sine of $\theta$ is given by:

$$\sin \theta = \frac{h - y}{r} \qquad (8)$$

and similarly:

$$\text{cosine} \, \theta = \frac{a - x}{r} \qquad (9)$$

Furthermore, from the Pythagorean theorem:

$$r = \sqrt{(a - x)^2 + (h - y)^2} \qquad (10)$$

Thus:

$$\sin e \theta = \frac{h - y}{\sqrt{(a - x)^2 + (h - y)^2}} \qquad (11)$$

And:

$$\text{cosine} \, \theta = \frac{a - x}{\sqrt{(a - x)^2 + (h - y)^2}} \qquad (12)$$

Substitution of equations (5) and (12) into equation (6) yields, with some algebraic manipulation:

$$V_y = \frac{\mu(a - x)}{(a - x)^2 + (h - y)^2} \qquad (13)$$

And substitution of equations (5) and (11) into equation (7) will give:

$$V_x = \frac{\mu(h - y)}{(a - x)^2 + (h - y)^2} \qquad (14)$$

It will be appreciated from the above that the velocities in the X and Y directions may be computed for any arbitrary point x, y. It will also be appreciated by examination of equation (1) that the streamlines for a single vortex of constant $\mu$ are a family of concentric circles about the vortex center. It will further be appreciated that as the values of x and y approach the center of the vortex a and h, respectively, that unrealistically high velocities in the x and y directions will occur, and, in fact, the velocities are undefined when x=a and y=h.

To more closely simulate realistic conditions, a predetermined limit may be placed on the denominator term $[(a-x)^2+(h-y)^2]$. If a, x, h and y are measured in feet, the denominator can be, for example, limited to 20,000 ft.$^2$ In effect, this limiting produces an "eye" in the vortex of radius 100 feet. Within the eye, both horizontal and vertical winds decrease linearly until they are null when x=a and y=h.

It is the purpose of the present invention to simulate the winds of a microburst using a combination of four or more vortices. For the sake of clarity, it will now be shown how the present invention implements the computation of the X and Y winds of a single vortex, with the inclusion of additional vortices to be shown later. The computation of the X and Y winds may be implemented by using conventional analog circuitry and computational techniques or by using conventional wholly digital techniques, or a by a combination of conventional hybrid digital - analog techniques. For example, summing junctions and amplifiers may be implemented by operational amplifiers appropriately configured, while logic and mathematical functions may be implemented in a digital computer or the hardware equivalent. Since the functional units represented by various blocks may be any one of the numerous devices for each respective function well known in the art, it is considered unnecessary to show circuit detail. For clarity and understanding of the invention, it will be explained by using a generally analog format, it being understood that the same analog format may also represent the programming of a programmable digital computer wherein the various analog inputs are converted to digital signals for digital processing.

Figure 3:
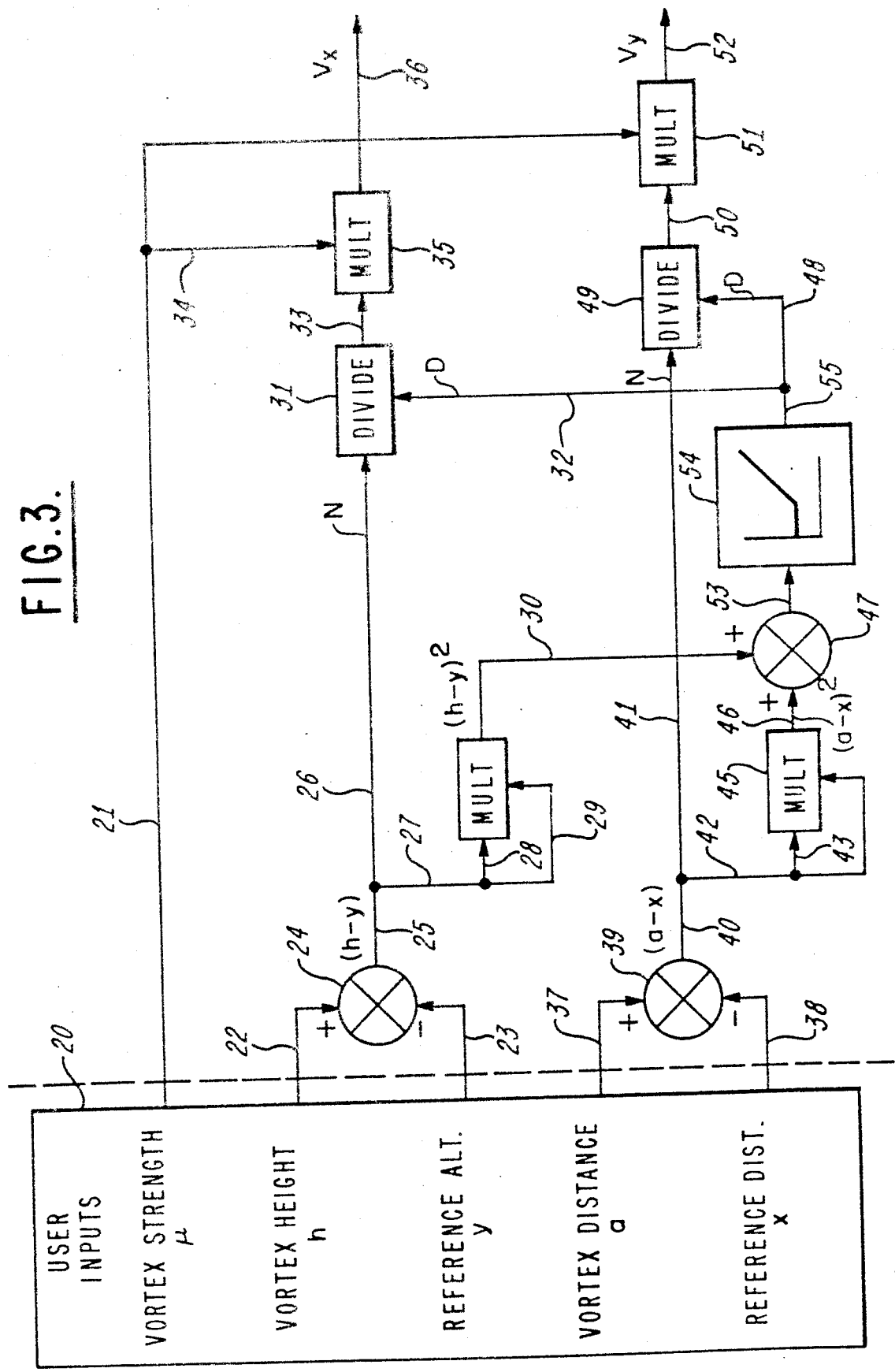
FIG. 3 is a schematic drawing in block diagram form showing how the winds from one vortex are computed in the present invention.

Referring now to FIG. 3, user inputs to the calculating process are provided by input device 20. Input device 20 may be of any type well known in the art such as a combination of potentiometers whose output voltage varies as a function of the potentiometer wiper position or a keyboard whose output may consist of either a digital word (for use by digital computers) or a voltage proportional to an input numerical value.

A signal proportional to the desired height or altitude of the vortex center is output on lead 22 and thence to conventional summation device 24. The desired altitude for computation, y, is output on lead 23 and thence to conventional summation device 24. Summation device 24 operates in such fashion as to output the algebraic difference between the signals on lead 22 and lead 23 on lead 25 and is therefore the quantity $(h-y)$ in equation (14) above. The quantity $(h-y)$ appears on lead 26 and is thereby supplied as the numerator for conventional divider 31, whose operation has yet to be described.

Concurrent with the action described immediately above, the signal representing $(h-y)$ appears on lead 27 and thence on leads 28 and 29. Leads 28 and 29, both of which carry the value of $(h-y)$, supply conventional multiplier 53. Conventional multiplier 53 acts in such a manner as to output the product of the values on leads 28 and 29 on lead 30. Consequently, the signal on lead 30 represents the term $(h-y)$ squared. Lead 30 supplies one input to conventional summation device 47.

A signal proportional to the distance of the vortex center from a desired origin, as for example the end of an airport runway, is input by the user and appears on lead 37 and thence to summation device 39. The desired distance for computation, x, is output on lead 38 and thence to summation device 39. Conventional summation device 39 operates in such a fashion as to output the difference between the signal appearing on lead 37 and the signal appearing on lead 38 on lead 40. Hence, the signal on lead 40 represents the term $(a-x)$ which appears in equation (13) above. The term $(a-x)$ also appears on lead 41 and thence to conventional divider 49 whose operation has yet to be described.

Concurrent with the action described above, the signal representing $(a-x)$ appears on lead 42 and thence on leads 43 and 44. Leads 43 and 44, both of which carry the value of $(a-x)$, supply conventional multiplier 45. Conventional multiplier 45 acts in such a manner as to output the product of the values on leads 43 and 44 on lead 46. Consequently, the signal on lead 46 represents the term $(a-x)$ squared. Lead 46 supplies one input to conventional summation device 47. Conventional summation device 47 outputs on lead 53 a signal representing the sum of the signals appearing on leads 30 and 46. Thus, the output of the summation device is the term $[a-x)^2+(h-y)^2]$. Lead 53 supplies conventional limiter 54. Limiter 54 operates in such a fashion as to produce a signal on lead 55 that can be no less than some predetermined value, as for example 20,000. If the value of the signal on lead 53 is greater than or equal to 20,000, then the signal on lead 55 would be identical to the signal on lead 53. If the signal on lead 53 is less than 20,000, the signal on lead 55 would be 20,000. This action produces an effective "eye" in the vortex as explained previously.

Lead 32 supplies conventional divider 31 with a denominator term, it being explained previously that the numerator term appears on lead 26. Conventional divider 31 outputs the quotient of the signal on lead 26 divided by the signal on lead 32 onto lead 33. Consequently, the signal on lead 33 is representative of $(h-y)$ divided by $[(a-x)^2+(h-y)^2]$.

The desired strength of the vortex is supplied by the human user on lead 21 and is designated as $\mu$. Lead 21 supplies conventional multiplier 35 via lead 34.

Conventional multiplier 35 acts in such a manner as to output the product of the signal on lead 34 and lead 33 onto lead 36. Hence, the signal appearing on lead 36 represents $\mu(h-y)$ divided by $[(a-x)+(h-y)^2]$ which will be recognized as the right side of equation (14) above and is therefore the value of the wind in the X direction, $V_x$.

Simultaneously, the term $[(a-x)^2+(h-y)^2]$ appears on lead 48 as explained previously and supplies the denominator term to conventional divider 49. As also explained previously, the numerator term representing $(a-x)$ appears on lead 41. Conventional divider 49 outputs the quotient of the values on leads 41 and 48 onto lead 50. Consequently, the value on lead 50 represents the term $(a-x)$ divided by $[(a-x)^2+(h-y)]$.

Lead 50 supplies conventional multiplier 51. Simultaneously the value of the vortex strength, $\mu$, is supplied to multiplier 51 via lead 54. Multiplier 51 produces the product of the values on leads 50 and 54 on lead 52. Consequently, lead 52 represents $\mu(a-x)$ divided by $[(a-x)^2+(h-y)^2]$ which will be recognized as the right side of equation (13) above and is therefore the value of the wind in the Y direction.

By the above description it will be clearly seen how the horizontal wind, $V_x$, and the vertical wind, $V_y$ may be derived. It will also be clear that the values of x and y shown on leads 23 and 38 may be supplied via a computer, either analog or digital in nature, that continuously computes the horizontal and vertical distances of a simulated aircraft relative to some desired point, as for instance a simulated airport runway, and supplies the values to the present invention.

In a further preferred embodiment, the strength of the vortex, designated as $\mu$, may be made time dependent; that is, the value may change with time in a predetermined way to more accurately simulate the occurrence of a microburst in the actual atmosphere.

Figure 4:
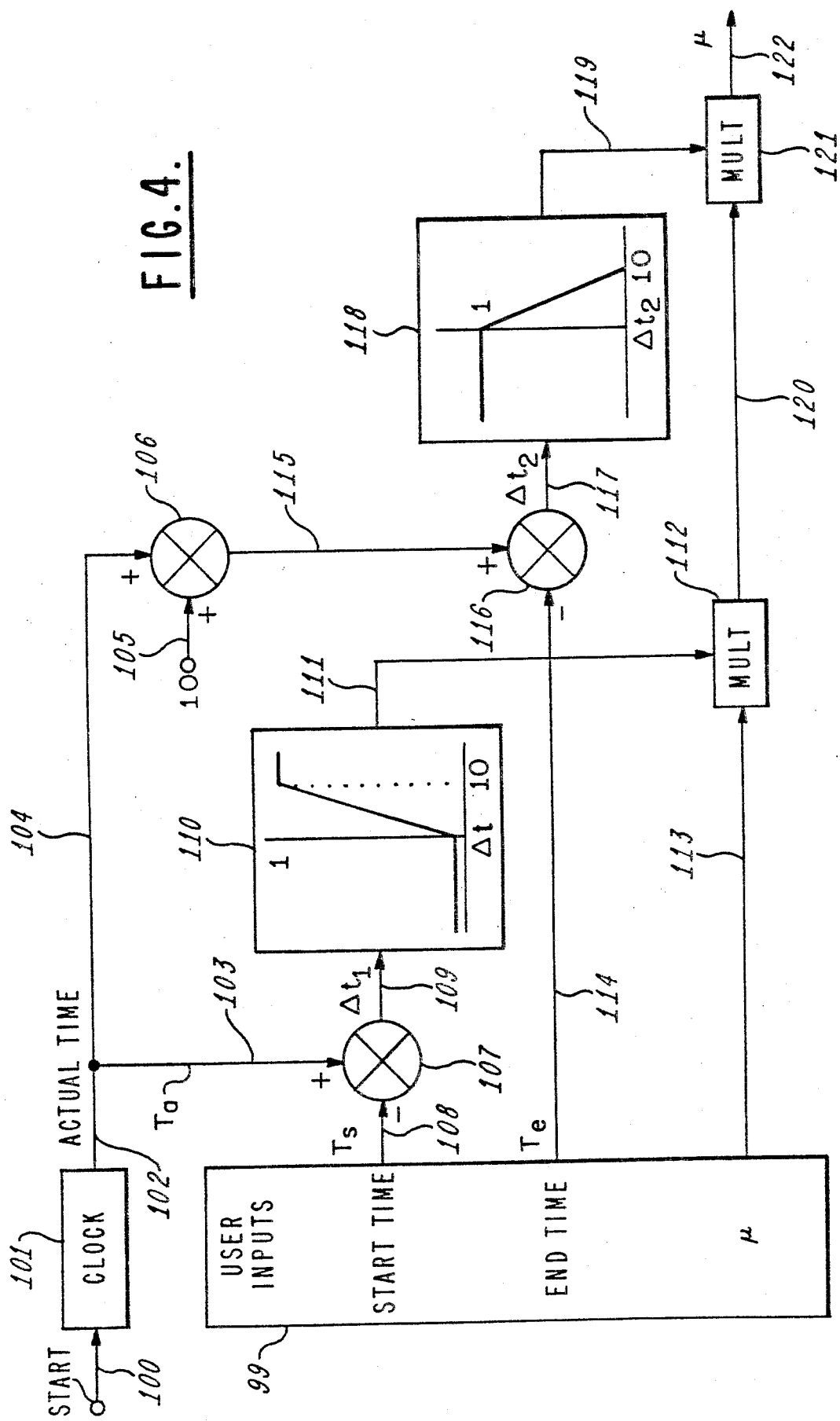
FIG. 4 is a drawing in block diagram form showing the implementation used to vary the strength of a single vortex with preselected start and end times.

Referring now to FIG. 4, human user desired parameters may be input in any conventional method as described heretofore. A signal representing the desired time to start the vortex simulation appears on lead 108 and is designated as $T_s$ and may be measured in seconds. A signal representing the desired end time appears on lead 114 and is designated as $T_e$, and finally, a signal representing the desired strength of the vortex appears on lead 113 and is designated as $\mu$. When the operator desires to start the simulation, he issues a start command to conventional clock 101. The starting of the clock may be performed in any conventional manner well known to those skilled in the art.

A signal representing actual elapsed time since the issuance of the start command appears on leads 102, 103 and 104. Lead 103 supplies one input to conventional summation device 107. The other input to summation device 107 appears on lead 108 and as discussed above, is a signal representative of the desired start time. Algebraic summation device 107 outputs the difference between the signal on lead 103 and the signal on lead 108 on lead 109. Hence, the signal on lead 109 is the difference in the actual elapsed time and the desired start time, $\Delta T_1$. Lead 109 supplies conventional gain block 110.

Gain block 110 operates in such a fashion as to output a zero on lead 111 provided that the signal on lead 109 is less than zero; that is, if the start time is greater than the actual time. Gain block 110 also outputs a value of 1 on lead 111 provided that the value on lead 109 is equal to or greater than 10. Any value on lead 109 that is between zero and 10 is output by dividing the output on lead 109 by the value of 10. For example, should the value on lead 109 be 5, the signal appearing on lead 111 would be 0.5, and so forth. It will be appreciated that the values of the time parameters set forth are merely exemplary, and are not to be considered limiting.

The value on lead 111 is supplied to conventional multiplier 112. Simultaneously, the operator desired value of $\mu$ appears on lead 113. Multiplier 112 produces the product of the value on lead 113 and the value on lead 111 onto lead 120. It will be appreciated that the value on lead 120 will therefore be zero whenever the value on lead 111 is zero and will be 1 times $\mu$ whenever the value on lead 111 is 1, and so forth.

Concurrent with the above described action, the value of elapsed actual time appears on lead 104 and thence to conventional summation device 106. A constant value, for example 10 seconds, appears on lead 105 and thence to summation device 106. Summation device 106 operates in such a fashion as to produce the sum of the values on leads 104 and 105 onto lead 115. Consequently, the value on lead 115 represents the actual elapsed time plus the constant value. Lead 115 supplies conventional summation device 116.

A signal representing the desired end time appears on lead 114 and thence to summation device 117. Summation device 117 outputs the difference between the values on lead 115 and lead 114 onto lead 117, the value on lead 117 being referred to as $\Delta T_2$.

Figure 5:
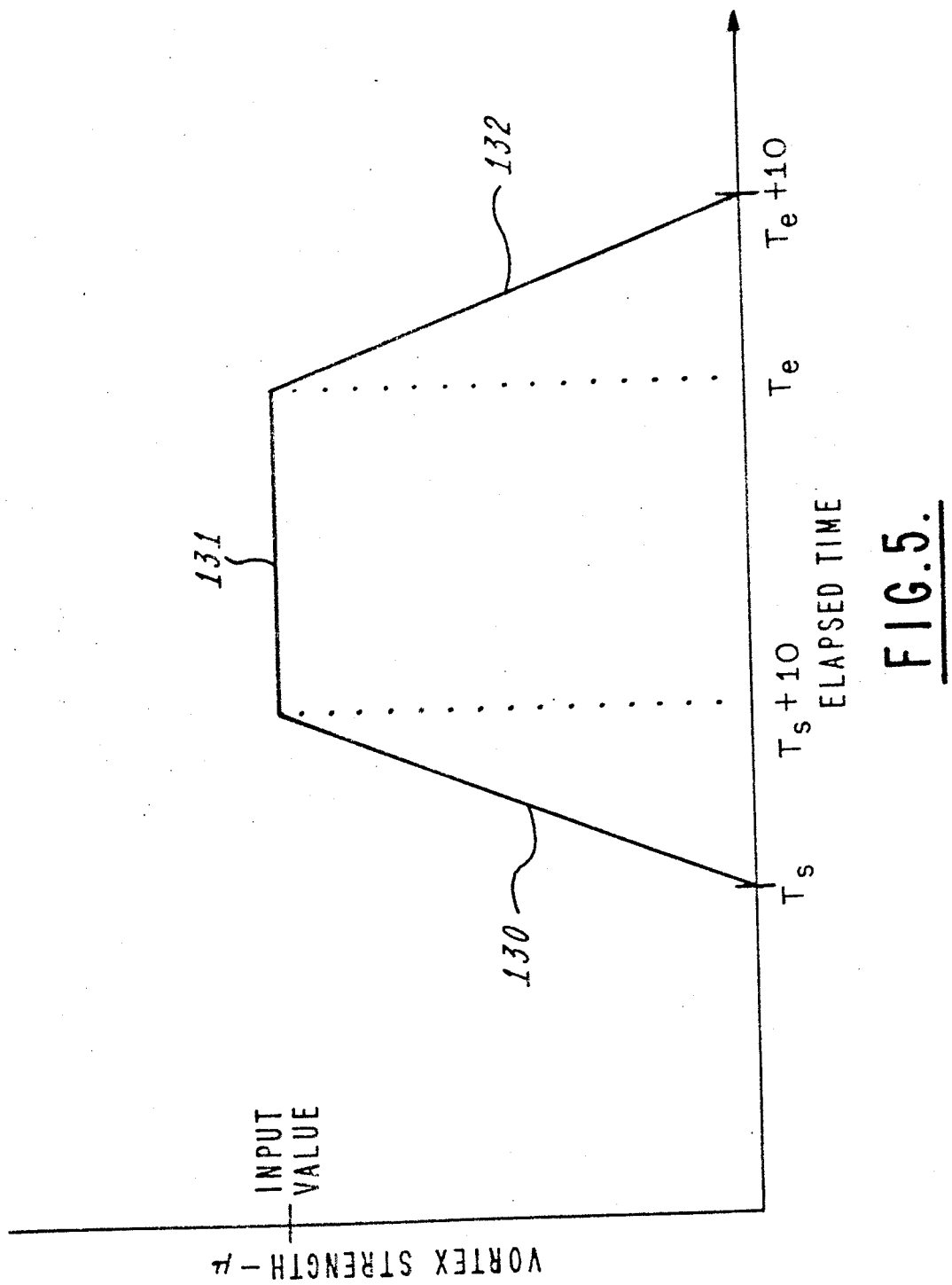
FIG. 5 is a graph illustrating the action of the block diagram of FIG. 4 in varying the strength of a single vortex.

Lead 117 supplies conventional gain block 118. Gain block 118 operates in the opposite fashion as gain block 110; that is, if the signal appearing on lead 117 is less than zero, gain block 118 outputs a value of 1 on lead 119. If the value of the signal on lead 117 is greater than 10, then a zero is output on lead 119. If the value on lead 117 is between zero and 10, the value appearing on lead 119 is the value on lead 117 divided by 10. Lead 119 supplies one input to conventional multiplier 121. The other input to multiplier 121 is supplied by lead 120. Multiplier 121 produces the product of the values on leads 119 and 120 on lead 122. Lead 122 represents the time-variant value of the originally selected vortex strength $\mu$. FIG. 5 illustrates the action of the block diagram of FIG. 4. Line segment 130 demonstrates the increasing value of $\mu$ as the elapsed time exceeds the start time, $T_s$. The value will increase toward the input value of $\mu$ until the input value is obtained 10 seconds after the start time. The value is thereafter maintained as shown by line segment 131 until the actual elapsed time is the value of the desired end time, $T_e$, whereafter $\mu$ will decrease toward zero, as shown by line segment 132, until, at the selected end time plus 10 seconds, it will be zero and maintained at zero thereafter. By this action, the starting time of the vortex may be selected and the strength of the vortex will be dependent on the user selected start and end times.

Figure 6:
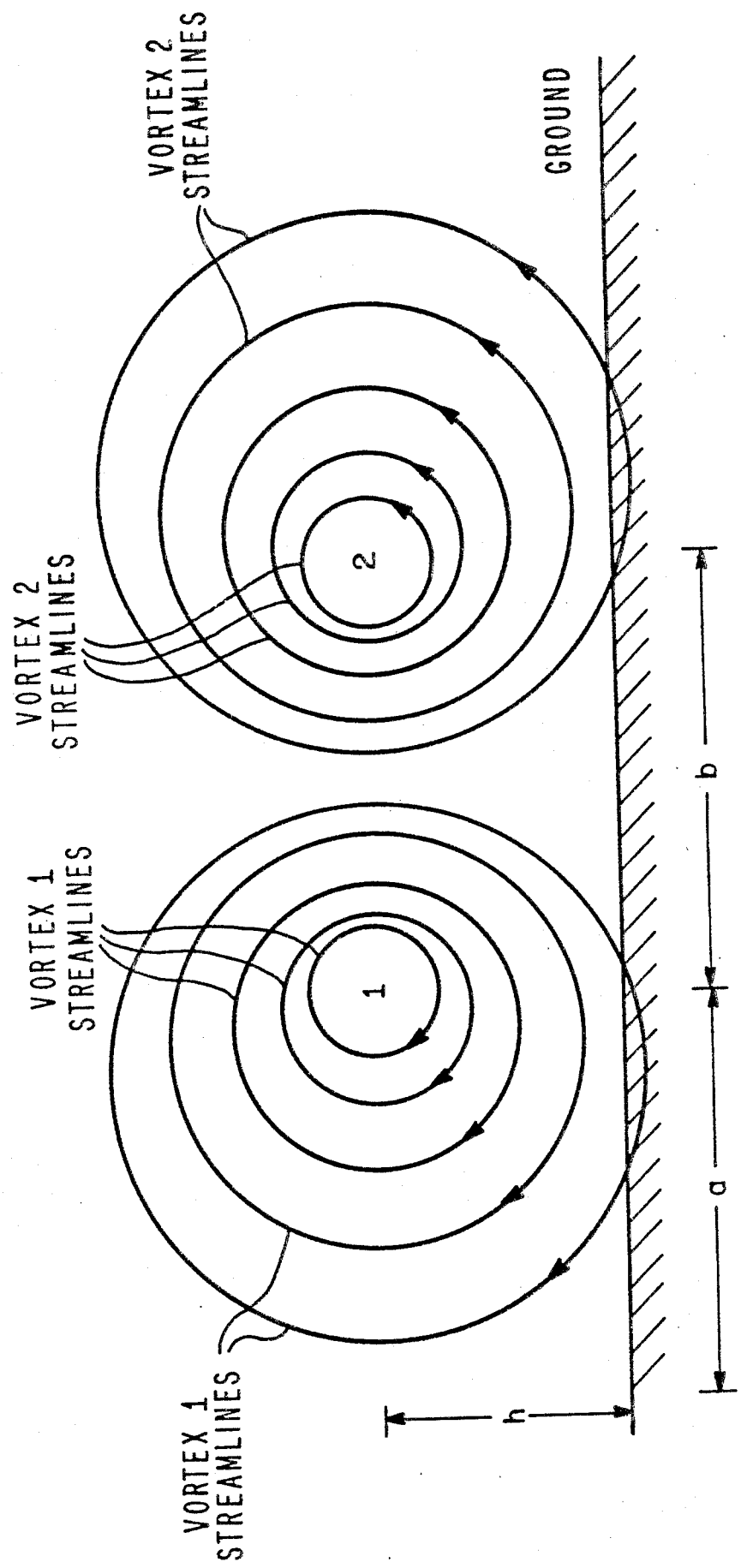
FIG. 6 is an illustration indicating the streamlines existing for two vortices.

While the above discussions illustrate the present invention's calculation and control of a single vortex, several vortices are required to accurately simulate the winds generated by a microburst. Referring to FIG. 6, two vortices are shown whose centers are at a distance h above the ground. The center of Vortex 1 is located at distance a from a selected reference point whereas the center of Vortex 2 is located at a distance of a+b. Vortex 1 rotates in a clockwise direction and Vortex 2 rotates in a counter clockwise direction. As is illustrated by the combined streamlines of the two vortices, the wind flow is similar in nature to the actual atmospheric microburst as shown on FIG. 1. However, it will also be noticed that the streamlines penetrate the ground, indicating winds occur below ground level which, of course, is not the case of an actual microburst. In particular, the vertical velocity of the wind in an actual microburst must be zero at the ground.

Figure 7:
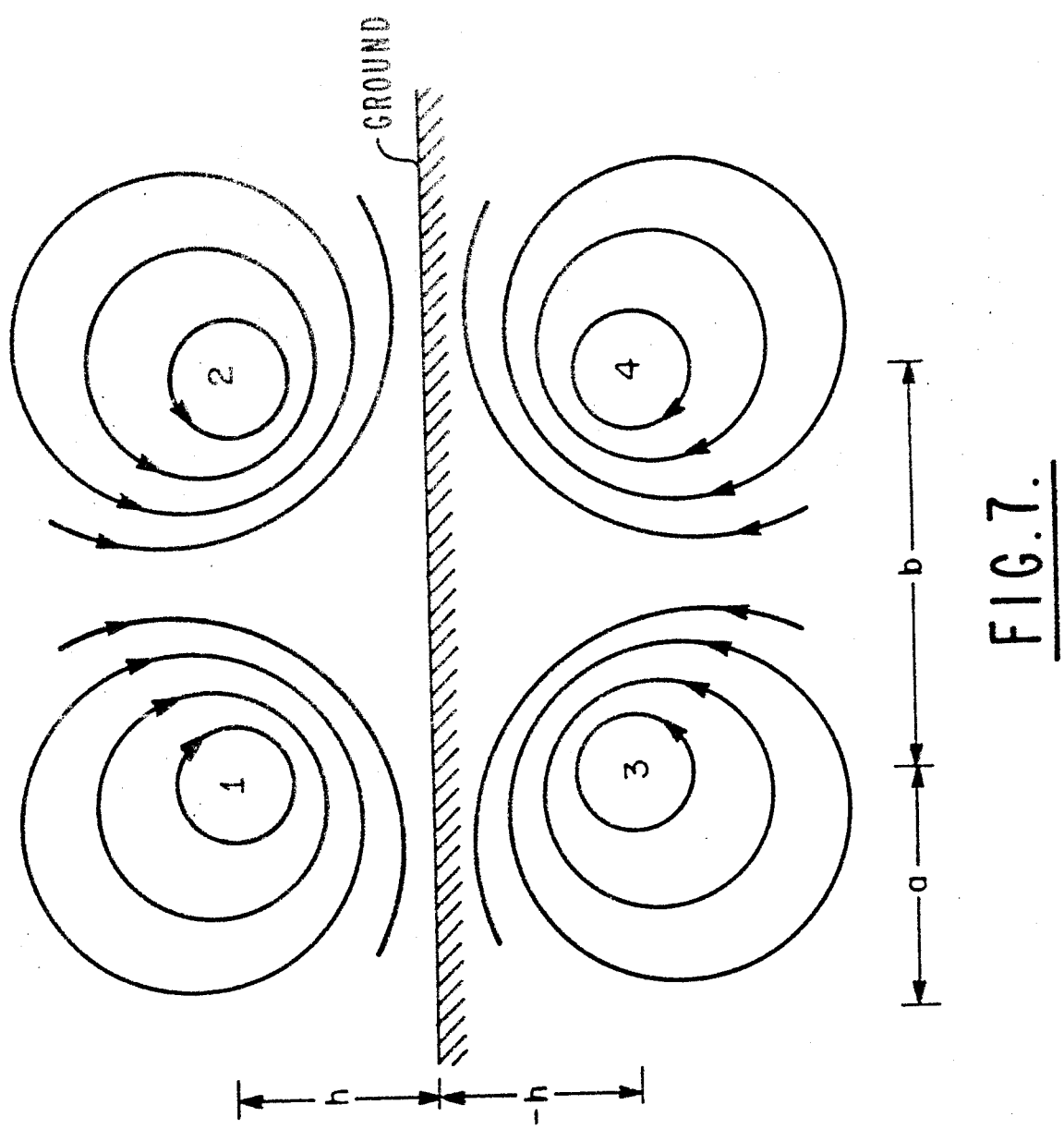
FIG. 7 is an illustration showing how four vortices may be placed to simulate the actual winds present in a microburst.

The anomaly of vertical winds occurring beneath the ground may be resolved by locating a vortex directly below Vortex 1 with identical strength, opposite rotation, and a vortex center at a distance of $-h$. A similar vortex is required beneath Vortex 2. This arrangement is shown FIG. 7. The Vortex labeled 3 on the Figure may be considered to be the mirror image of Vortex 1 Similarly, Vortex 4 is the mirror image of Vortex 2. While vortices beneath the ground do not in fact exist, the resultant winds produced at and above the ground do accurately simulate the winds created by an actual microburst. Since aircraft, of course, fly above the ground, the method of using four vortices does create a realistic wind field for the investigation of windshear detection and alerting systems. This will be clearly seen by comparing the streamlines above the ground of FIG. 7 with the streamlines of the microburst depicted in FIG. 1.

Figure 8:
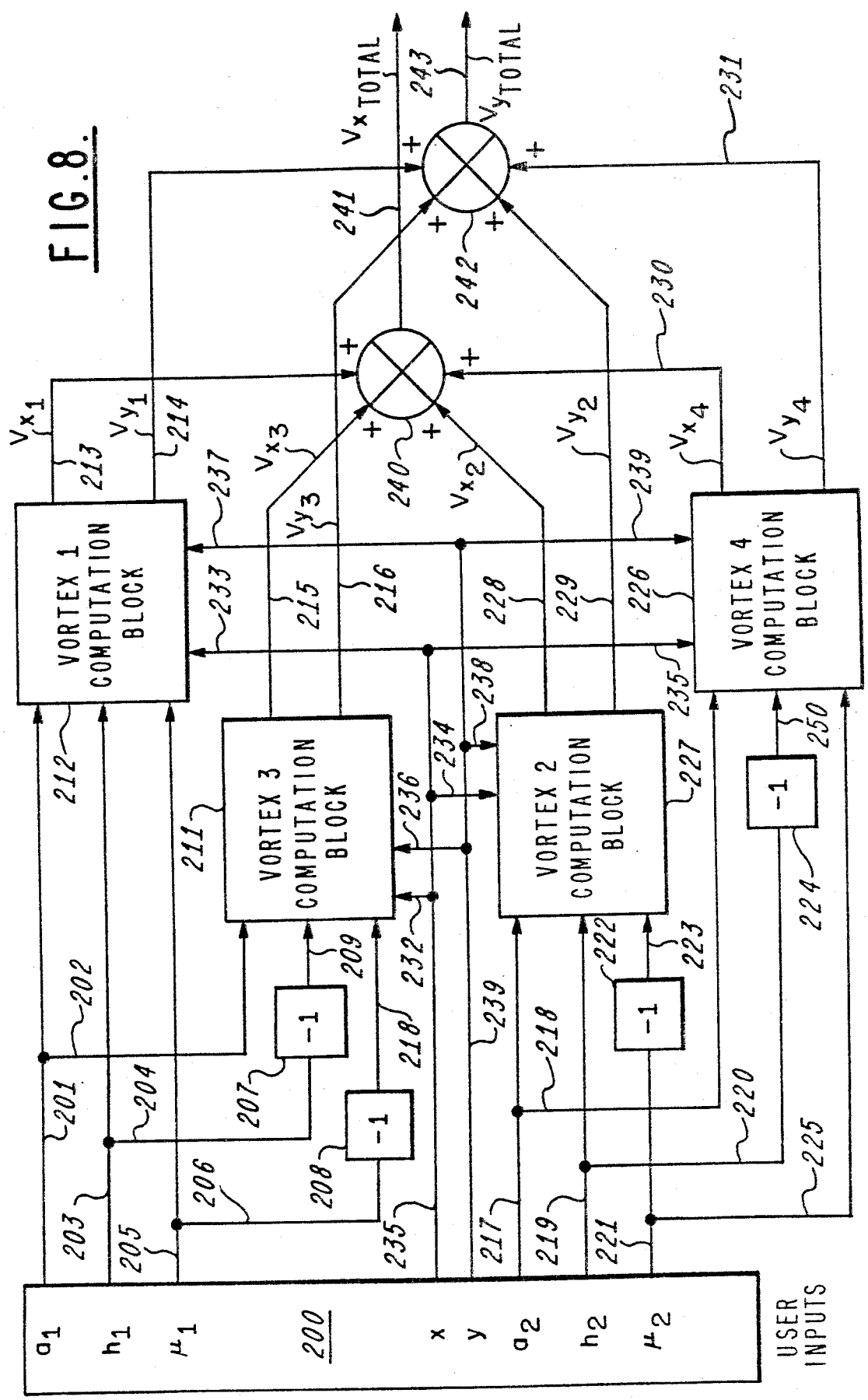
FIG. 8 is a schematic drawing in block diagram form, showing the summation of the resultant winds for a four vortex configuration of the present invention.

It will also be clear that the block diagram shown in FIG. 3 may be used to compute each of the required vortices wherein the mathematical sign of $\mu$ represents the direction of vortex rotation (positive being clockwise, negative counterclockwise). And in a similar fashion, the distances of the vortex centers may be specified individually. FIG. 8 illustrates in block diagram form the implementation of four vortices. Desired parameters are input via block 200 whose operation is similar in nature to block 20 of FIG. 3. These inputs are directed to appropriate Vortex Computation Blocks 1, 3, 2 and 4.

Each of the Vortex Computation Blocks will be understood to represent the computational paths shown to the right of the vertical dashed line of FIG. 3.

Each Vortex Computational Block is supplied with the desired horizontal distance, x, and vertical distance, y, for which the winds are to be computed. The horizontal distance x appears on leads 232, 233, 234, and 235 thereby supplying Vortex Computation Blocks 3, 1, 2 and 4 respectively. The vertical distance y appears on leads 236, 237, 238 and 239 thereby supplying Vortex Computation Blocks 3, 1, 2 and 4 respectively.

The desired parameters for the first vortex pair appear on leads 201, 203, and 205 and are thereby routed to Vortex Computation Block 1, 212. These inputs are the distance $a_i$, the altitude $h_1$, and the strength $\mu_i$ of Vortex 1 respectively. These parameters are also routed toward Vortex Computation Block 3, 211, via leads 202, 204, and 205. To reverse the altitude, the value of $h_i$ is applied to conventional gain block 207. Gain block 207 reverses the mathematical sign of the altitude $h_1$ by multiplying the value on lead 204 by $-1$. The output of gain block 207 appears on lead 209 and thence is supplied to Vortex Compution Block 3. In this manner, Vortex Computation Block 3 will utilize a vortex that is directly below Vortex 1, with opposite rotation, and at an altitude h feet below the ground.

The outputs of Vortex Computation Block 1 are the horizontal wind and vertical wind due to Vortex 1. The horizontal wind is labeled $Vx_1$ and appears on lead 213. The vertical wind is labeled $Vy_1$ and appears on lead 214.

The outputs of Vortex Computation Block 3 are the horizontal wind and vertical wind due to Vortex 3, the mirror image of Vortex 1, and are labeled $Vx_3$ and $Vy_3$ respectively. $Vx_3$ appears on lead 215 and $Vy_3$ appears on lead 216.

The parameters for the second vortex pair appear on leads 217, 219 and 221 and represent the distance, $a_2$, the altitude $h_2$, and the strength $\mu_2$, respectively. As it is desired that Vortex 2 rotate counterclockwise, the strength of the vortex is applied to gain block 222 which multiplies the signal on lead 221 by $-1$. Vortex Computation Block 2, 227, receives the distance, altitude, and vortex strength multiplied by $-1$ on leads 217, 219 and 223 respectively. The outputs of Vortex Computation Block 2 appear on leads 228 and 229 and H represent the horizontal wind $Vx_2$ and the vertical wind $Vy_2$ respectively.

Simultaneously leads 218 and 225 supply Vortex Computation Block 4, 226, with the values representing the distance and vortex strength>respectively. The value of altitude, $h_2$, appears on lead 220 and thence to conventional gain block 224. Gain block 224 multiplies the value appearing on lead 220 by a value of $-1$ thus reversing the mathematical sign of the altitude and outputs the result on lead 250 and thence to Vortex Computation Block 4, 226.

The outputs of Vortex Computation Block 4 appear on leads 230 and 231, the values of which represent the horizontal wind $Vx_4$ and vertical wind $Vy_4$ due to Vortex 4, respectively.

The value of horizontal wind due to each vortex is supplied to conventional summation device 240 via leads 213, 215, 228 and 230. The output of summation device 240 appears on lead 241 and represents the sum of the values on the input leads and is thus the total horizontal wind generated by the four vortices.

In a similar manner, the vertical wind due to each vortex is supplied to conventional summation device 242 via leads 214, 216, 229 and 231. The output of summation device 242 appears on lead 243 and represents the total vertical wind due to the four vortices.

The total horizontal and vertical winds may be output for the human user in terms of either a voltage reading or a digital word using procedures well known to those skilled in the art. In addition, the values may be supplied to an analog or digital computer whose purpose is to simulate an aircraft in flight thereby allowing the simulated aircraft to experience winds similar in nature to those experienced in an actual microburst. In this latter case, the horizontal and vertical distances of the aircraft generated by the aircraft simulator could be used with appropriate conversion well known to those skilled in the art to supply the x and y parameters used in Vortex Computation Blocks 1 through 4.

It will be apparent from the foregoing that the human user of the present invention may determine the strength, distance and height of each Vortex pair independently, thereby allowing a maximum of flexibility in simulating actual microbursts. It will also be apparent that other vortex pairs could be added to the present invention using the same techniques discussed heretofore to add additional flexibility in microburst simulation.

Figure 9:
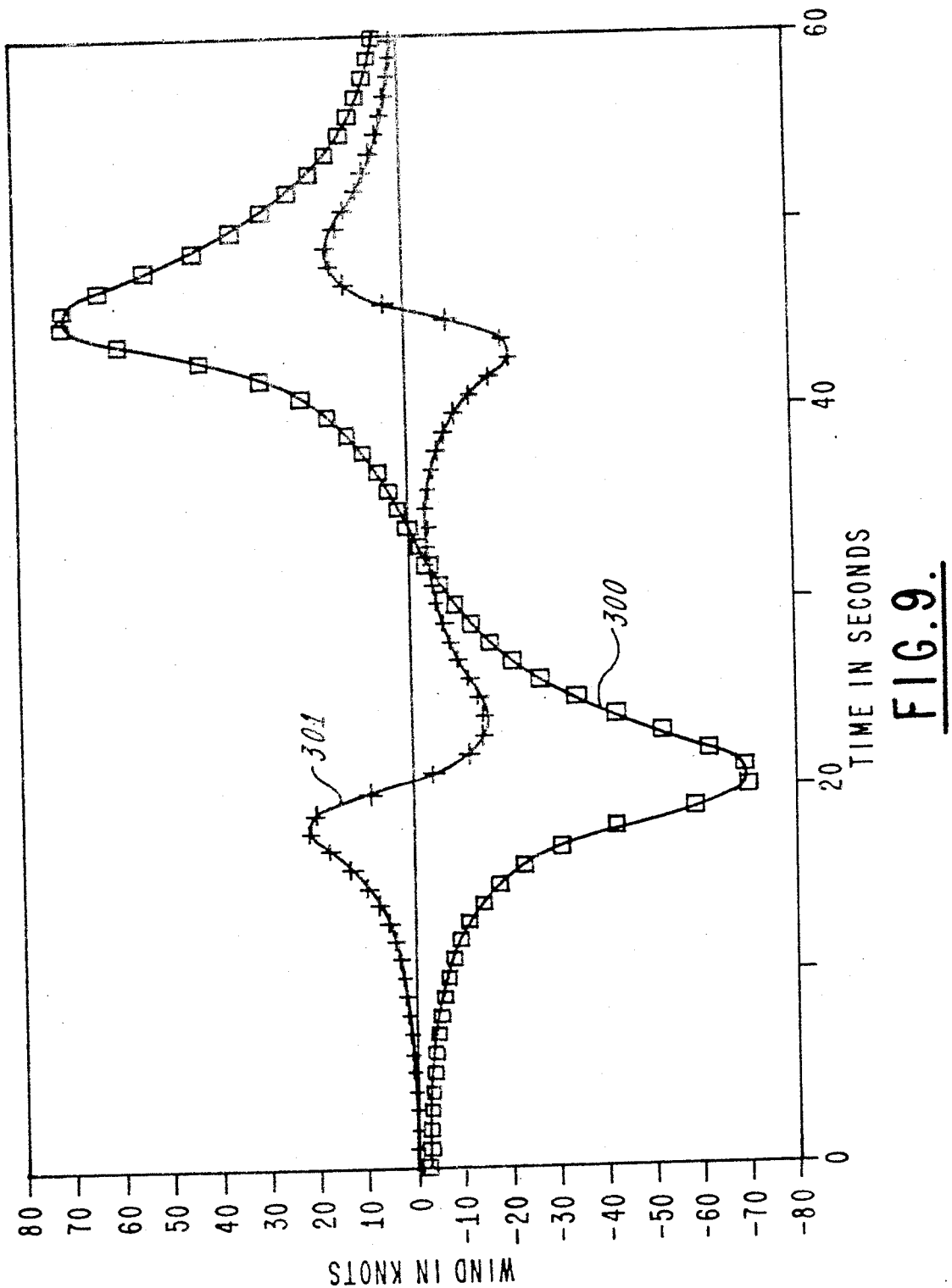
FIG. 9 is a graph illustrating the horizontal and vertical winds generated by the present invention plotted against time when connected to a digital computer used to simulate aircraft flight.

FIG. 9 illustrates the results of the present invention when used with a digital computer simulating aircraft flight. The abscissa of the graph represents elapsed time while the ordinate axis is the wind magnitude in knots. Line 300 is a plot of the horizontal wind while line 301 is a plot of the vertical wind. With the values of vortex strength, altitude and distance used in FIG. 9, the winds actually experienced by an aircraft at New Orleans airport prior to crash are simulated closely.

The prior discussion of the present invention has assumed that the horizontal wind was in the direction of aircraft flight for the sake of clarity of understanding. That is, it was assumed that the aircraft's flight path was parallel to the plane of the centers of the vortices. This is shown pictorially in FIG. 10. FIG. 10 is a plan view of an aircraft 400 flying along flight path 401 which is coincident with a geometric plane passing through the centers of all four vortices 402. Consequently, the horizontal wind will act only along the longitudinal axis of the aircraft. In reality this rarely occurs when an actual aircraft encounters an actual microburst.

As a further aspect of the present invention, the horizontal wind may be resolved along the flight path of the aircraft as well as perpendicular to it. Referring to FIG. 11, the aircraft 410 flies along flight path 411. Flight path 411 forms an angle $\beta$, 413, with the plane formed by the centers of the four vortices, 412. By computations heretofore described, the horizontal wind acts along the plane of the vortex centers and might have the magnitude and direction indicated by Vector 417. The magnitude of Vector 417 may be derived in a conventional manner by taking the square root of the sum of the squares of the horizontal component Vx and vertical component Vy, as determined from the apparatus of FIG. 8. By plane geometry, the resolution of the wind along the aircraft's flight path 411 is determined by:

$$V_L = V_t \cosine \beta$$

where $V_L$ is the wind magnitude along the flight path, $V_1$ the total wind magnitude and $\beta$ the angle between the aircraft's flight path and the plane of the centers of the vortices.

Similarly, the orthogonal wind, or cross-wind, to the flight path may be found from the equation:

$$V_c = V_T \sin \beta$$

where $V_c$ is the orthogonal component or cross wind.

Figure 12:
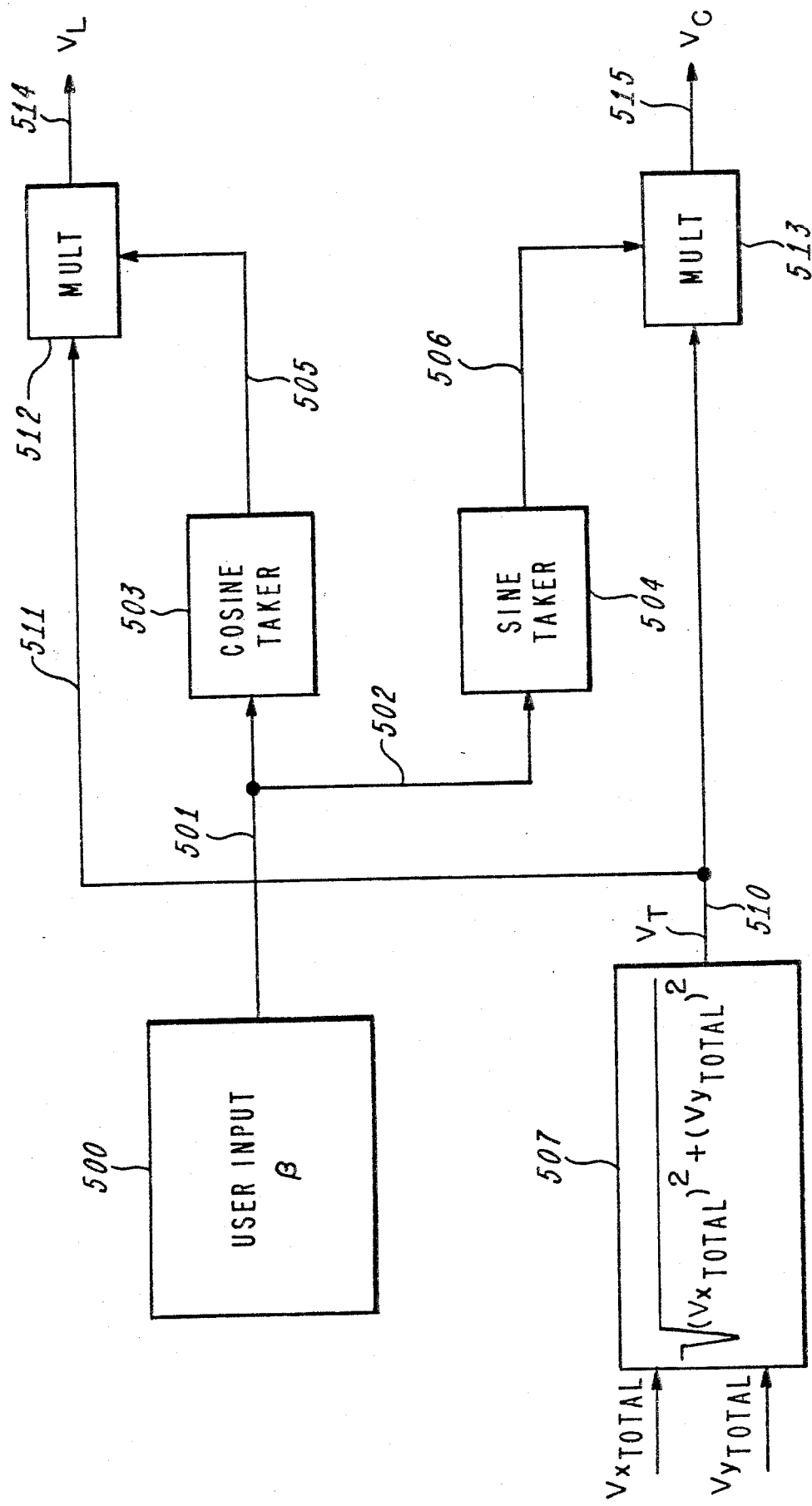
FIG. 12 is a schematic drawing in block diagram form showing an apparatus for the resolution of the total horizontal wind along and orthogonal to the flight path of the simulated aircraft.

Referring now to FIG. 12, the angle of the flight path of simulated flight relative to the plane of the vortex centers is supplied by the human user of the invention in the method heretofore described and appears on leads 501 and 502. Lead 501 supplies conventional cosine taker 503 whose function is to output a signal proportional to the cosine of the angle appearing on lead 502. Lead 502 supplies conventional sine taker 504 whose function is to output a signal proportional to the sine of the angle appearing on lead 502.

Simultaneously, the total horizontal wind computed by the apparatus of FIG. 8 appears on lead 510 and lead 511. The value on lead 510 is supplied to conventional multiplier 513 whose output is the product of the signal on lead 510 and the signal on lead 506. Hence, the output of the multiplier appears on lead 515 and is representative of the value of the cross-wind component of horizontal wind, $V_c$.

Lead 511 supplies conventional multiplier 512. Multiplier 512 outputs a value equal to the product of the value on lead 511 and the value on lead 505. The output of multiplier 512 appears on lead 514 and is a value equal to the component of horizontal wind in the direction of the aircraft's flight path. The signals of $V_L$ and $V_c$ may be used in an identical manner as was discussed for the use of the total wind V.

While the invention has been described in its preferred embodiments, it is to be understood that the vortex centers is supplied by the human user of the invention or the aircraft simulator in the method heretofore described and appears on leads 501 and 502. Lead 501 supplies conventional cosine taker 503 whose function is to output a signal proportional to the cosine of the angle appearing on lead 502. Lead 502 supplies conventional sine taker 504 whose function is to output a signal proportional to the sine of the angle appearing on lead 502.

Simultaneously, the total horizontal wind computed by the apparatus of FIG. 8 appears on lead 510 and lead 511. The value on lead 510 is supplied to conventional multiplier 513 whose output is the product of the signal on lead 510 and the signal on lead 506. Hence, the output of the multiplier appears on lead 515 and is representative of the value of the cross-wind component of horizontal wind, $V_c$.

Lead 511 supplies conventional multiplier 512. Multiplier 512 outputs a value equal to the product of the value on lead 511 and the value on lead 505. The output of multiplier 512 appears on lead 514 and is a value equal to the component of horizontal wind in the direction of the aircraft's flight path. The signals of $V_L$ and $V_C$ may be used in an identical manner as was discussed for the use of the total wind $V_T$.

While the invention has been described in its preferred embodiments, it is to be understood that the words which have been used are words of description rather than limitation and that changes may be made within the purview of the appended claims without departing from the true scope and spirit of the invention in its broader aspects.

Embodiments of an invention in which an exclusive property or right is claimed are defined as follows:

1. A method for testing the effectiveness of a windshear alerting and flight guidance system for airborne use, by dynamically modelling the magnitude of a microburst windshear encounter with the aid of a digital computer and by generating a test signal to establish an alarm threshold at which it is prudent to provide a warning of rapidly changing winds, comprising:

providing said computer with a stored program, said stored program comprising a plurality of vortex models, each such model representing a particular plurality of concentric streamlines varying in strength, displacement relative to each other vortex model, and location of a center of each vortex model, providing said computer with digital signals defining a desired vortex model configuration, said digital signals representative of at least a predetermined strength, height of a vortex center above a ground plane, a reference altitude with respect to said ground plane corresponding to a desired point of windshear encounter, a reference distance along said ground plane at said desired point of windshear encounter, and a distance of said vortex center from a given point of origin on said ground plane, processing said digital signals in said computer to derive a further digital signal corresponding to thee vector value of a horizontal windshear component at said desired point of encounter, providing said digital computer with a further stored program, said further stored program comprising a predetermined flight path of an aircraft, processing said further stored program in said digital computer continuously to derive digital signals representative of vertical and horizontal positions of said aircraft along said flight path, applying said derived aircraft positional signals to said digital computer to vary dynamically said signal corresponding to the vector value of a horizontal wind component and a vertical wind component in accordance with said flight path, applying said dynamically varied signal to said windshear alerting and flight guidance system to activate an alarm indicating detection of a windshear, and adjusting said windshear alerting and flight guidance system to establish an alarm threshold corresponding to predetermined values of said vertical and horizontal windshear components at which a stall condition of said aircraft is imminent.

2. The method as set forth in claim 1, further comprising the steps of applying said dynamically varied signal to vary said magnitude of a first vortex with respect to a time duration.

3. The method as set forth in claim 2, further comprising the step of varying the center of said first vortex with respect to said point of origin.

4. The method as set forth in claim 3, further comprising the step of defining said derived model so as to vary said magnitude inversely as to the radial distance from the center of said first vortex, and defining a radial distance within said first vortex wherein said magnitude decreases linearly from a first predetermined value to a null value at said first center of said first vortex.

5. The method as set forth in claim 4, wherein said derives model is defined by:

computing a velocity Vy along a first coordinate representative of a first vector component of said velocity at a given one of said predetermined points, and computing a velocity Vx along a second coordinate representative of a second vector component of said velocity at said given one of said predetermined points.

6. The method as set forth in claim 5, further comprising the steps of:

modelling said first vortex at a predetermined magnitude and first direction of rotation, wherein said first vector has a center at a predetermined distance from said origin along said ground plane and a predetermined altitude from said ground plane, modelling a second vortex having a center at a predetermined distance from said center of said first vortex along said ground plane and at said predetermined altitude, and having a second direction of rotation opposing said first direction of rotation, modelling a third vortex below said ground plane as a mirror image of said first vortex, and modelling a fourth vortex below said reference plane as a mirror image of said second vortex.

7. The method as set forth in claim 6, further comprising the step of linearly aligning a plurality of centers of said first, second, third and fourth vortices in a plane, and defining said flight path or said aircraft at a given angle of its longitudinal axis with respect to said plane of vortices.

8. In a windshear threshold calibration apparatus, having an output for activating a windshear alerting and alarm system, the improvement comprising:

means for simulating the effect of microbursts on said windshear alerting and alarm system, said means comprising a stored program representing a plurality of associated windshear vortices, means for selecting a particular set of windshear conditions represented by a combination of said windshear vortices, means for simulating the flight path of an aircraft, means for combining said simulated flight path and said combination of windshear conditions to address a digital computer for dynamically determining substantially in real time the windshear condition at each point of said flight path, and means responsive to an output of said digital computer for generating a signal for activating said windshear alerting and alarm system when said aircraft encounters a predetermined windshear condition modified by said aircraft position and said set of windshear conditions, said predetermined windshear condition representative of a predetermined hazardous flight condition.

9. Windshear calibration apparatus as set forth in claim 8, comprising:

means for modeling a given vortex representative of a continuum of variations in air velocity at predetermined points with respect to a reference plane and a reference point of origin, means for defining said simulated flight path of the aircraft with respect to said given vortex, means for applying a control signal to selectively vary the magnitude of said given vortex at said predetermined points, and means for utilizing the defined position of said aircraft to determine the velocity components of said given vortex encountered by said aircraft as it traverses said reference plane.

10. The apparatus as set forth in claim 9, further comprising:

means for providing a signal representative of a predetermined altitude of a center of said given vortex, means for providing a signal representative of a predetermined distance from said center of said given vortex along said ground plane distal to said point of origin, means for providing a signal corresponding to a predetermined parameter representative of the magnitude of said given vortex.

means for providing a signal representative of the altitude of said aircraft with respect to said ground plane, and means for providing a signal representative of the distance of said aircraft from said point of origin to said center of said given vortex along said ground plane.

11. The apparatus as set forth in claim 10, further comprising:

first summation means responsive to said altitude signals corresponding to the position of said given vortex and said flight path of said aircraft for providing an algebraic sum thereof, second summation means responsive to said distance signals corresponding to the position of said given vortex and said flight path of said aircraft for providing an algebraic sum thereof, first multiplier means for providing a product of said algebraic sum of said first summation means, second multiplier means for providing a product of said algebraic sum of said second summation means, third summation means responsive to said first and second products for providing an algebraic sum thereof, limiter means responsive to said third summation means for providing at least a predetermined summation value irrespective of said applied algebraic sum, first divider means responsive to said first summation means and said limiter means for providing a quotient thereof, second divider means responsive to said second summation means and said limiter means for providing a quotient thereof, third multiplier means responsive to said signal representative of the magnitude of said given vortex and said quotient of said first divider means for providing a product signal thereof, said product signal representative of a first vector component of said given vortex in accordance with a distance from said point of origin along the plane of said reference plane, and fourth multiplier means responsive to said magnitude of said given vortex and said quotient of said second divider means for providing a product signal thereof, said product signal representative of a vector component of said given vortex in accordance with said altitude of said aircraft.

12. The apparatus as set forth in claim 11, wherein said vector component in accordance with the distance from said point of origin along the plane of said reference plane is defined by the relationship $$V_y = \frac{\mu(a - x)}{(a - x)^2 + (h - y)^2}$$

and said vector component in accordance with said altitude said aircraft is defined by the relationship $$V_x = \frac{\mu(h - y)}{(a - x)^2 + (h - y)^2}$$

where $V_x$ is the magnitude of a horizontal component of a vortex, $V_y$ is the magnitude of a vertical component of the vortex, a is the distance along the reference plane from the point of origin to the center of the vortex, h is the altitude from the reference plane to the center of the vortex, x is an arbitrary point in the vortex corresponding to the distance of the aircraft from the point of origin along the reference plane, y is an arbitrary point in the vortex corresponding to the altitude of the aircraft with respect to the reference plane.

13. The apparatus as set forth in claim 9, wherein said means for applying a control signal to selectively vary the magnitude of said given vortex comprises means for varying said magnitude in accordance with a predetermined function of time.

14. The apparatus as set forth in claim 13, further comprising:

clock means for providing a clock signal representative of an actual duration of time, start time means for providing a signal corresponding to a desired starting time for varying the magnitude of said given vortex, end time means for providing a signal corresponding to a desired end time for terminating the variation in magnitude of said given vortex, first summation means responsive to said clock signal and said starting time signal for providing a signal in accordance with an algebraic sum thereof, second summation means responsive to said clock signal and a predetermined time signal for providing a signal in accordance with an algebraic sum thereof, first limiter means responsive to said first summation means for providing a null output when said start time signal exceeds said actual time signal, for providing an output having a value proportional to a predetermined elapsed time interval when said actual time signal is at least equal to said start time signal and for providing an output value of unity when said actual time exceeds said predetermined time interval, first multiplier means responsive to a predetermined magnitude of said given vortex and said output of said first limiter means for providing a product thereof, third summation means responsive to said second summation means and to said end time signal for providing a signal in accordance with an algebraic sum thereof, second limiter means responsive to said third summation means for producing an output value of unity when said algebraic sum of said third summation means has a value less than zero, for producing an output inversely proportional to a further predetermined time interval when said algebraic sum of said third summation means is equal or greater than zero, and for producing a null output when said sum of said third summation means exceeds said further predetermined time interval, and second multiplier means responsive to said product produced by said first multiplier means and to said second limiter means, for providing a product thereof, said product providing a time varying output signal representative of a time varying microburst.

15. The apparatus as set forth in claim 9, further comprising means for modelling a plurality of said vortices comprising:

means representative of first and third vortices located on opposing sides of said reference plane and having corresponding streamlines of equal magnitude and opposing directions each of said vortices having a center at a given altitude with respect to said reference plane and a given displacement along said reference plane with respect to said point of origin, and means representative of second and fourth vortices located on opposing sides of said reference plane and having corresponding streamlines of equal magnitude and opposing directions, said streamlines of said first vortex further opposing said streamlines of said second vortex, said streamlines of said third vortex further opposing said streamlines of said fourth vortex, said third and fourth vortices being colocated below said reference plane with respect to said first and second vortices in mirror image thereof.

16. The apparatus as set forth in claim 15, further comprising:

user input means for providing a plurality of control signals defining vortex magnitude and location of a vortex with respect to said reference plane and said point of origin, said user input means adapted for simultaneously providing at leas two sets of said plurality of control signals, and for providing a signal defining thee location of said aircraft with respect to said vortex, said user input means comprising means for applying one of si two sets of said control signals corresponding to predetermined values of altitude, magnitude and direction, and distance from the point of origin along the reference plane to said first vortex, means for applying said signals corresponding to predetermined values of altitude, magnitude, direction and distance from the point of origin along the reference plane to said third vertex and means for inverting said altitude and direction signals so as to generate said third vortex as a mirror image of said first vortex.

said user input means further comprising means for applying a further one of said two sets of control signals corresponding to further predetermined values of altitude, magnitude and direction, and distance from the point of origin along the reference plane to said second vortex.

means for applying said further one set of control signals corresponding to said further predetermined values of altitude, magnitude and direction, and distance from the point of origin along the reference plane to said fourth vortex, and means for inverting said further values of altitude and direction signals so as to generate said fourth vortex as a mirror image of said second vortex, first summation means responsive to vertical components of said first, second, third and fourth vortices for providing an algebraic sum thereof representative of the vector summation of said vertical components, and second summation means responsive to horizontal components of said first, second, third and fourth vortices for providing an algebraic sum thereof representative of the vector summation of said horizontal components.

17. The apparatus as set forth in claim 16, wherein said aircraft traverses said centers of said vortices at an oblique angle, and said vortices are aligned with their centers substantially in a plane, further comprising:

means for providing a longitudinal wind component in accordance with the function $$V_L = V_T \text{cosine} \beta$$

where
$V_L$ is the wind magnitude along the flight path
$V_T$ is the total wind magnitude formed by vector summation of the vertical and horizontal components,
$\beta$ is the angle between the vertical plane containing the flight path and the plane of the centers of the vortices, and means for providing a cross-wind component in accordance with the function $$V_c = V_T \sin \beta$$

where Vc is the cross wind component.

18. The apparatus as set forth in claim 17, further comprising:

user input means for providing a signal in accordance with the angle of the flight path of the aircraft with respect to said plane of the centers of the vortices, means responsive to said user input signal for deriving a cosine function of said flight path angle, means responsive to said user input means for deriving a sine function of said flight path angle, means responsive to said first and second summation means for providing the vector sum of said horizontal and vertical components of said plurality of vortices and deriving a magnitude thereof, first multiplier means responsive to said cosine function and said derived vector magnitude for providing a product thereof, said product comprising a longitudinal windshear component along the flight path of the aircraft, and second multiplier means responsive to said sine function and said derived vector magnitude for providing a product thereof, said product comprising a cross-wind windshear component with respect to the flight path of the aircraft.

* * * * *